No. 711,120. Patented Oct. 14, 1902.
E. POMEROY.
PASTE HOLDER.
(Application filed Dec. 6, 1901.)
(No Model.)

Attest:
Edith Sarles
Herbert A. Whipple

Inventor:
Eltweed Pomeroy
By his attorney
Edith J. Griswold

THE NORRIS PETERS CO., PHOTO-LITHO., WASHINGTON, D. C.

UNITED STATES PATENT OFFICE.

ELTWEED POMEROY, OF EAST ORANGE, NEW JERSEY.

PASTE-HOLDER.

SPECIFICATION forming part of Letters Patent No. 711,120, dated October 14, 1902.

Application filed December 6, 1901. Serial No. 84,882. (No model.)

*To all whom it may concern:*

Be it known that I, ELTWEED POMEROY, a citizen of the United States, and a resident of East Orange, Essex county, State of New Jersey, have invented Improvements in Paste-Holders, of which the following is a specification.

My invention relates to paste holders or jars, and has for its object to provide means for maintaining the upper surface of the paste in a moist condition ready for use at all times. To accomplish this automatically, I provide the paste-holder with a reservoir for water and with means for delivering the water to the upper surface of the paste in such a manner that the water will spread over and sink into the top layers of the paste. Only a small quantity of water being necessary to keep the paste in proper condition, I preferably make use of a material capable of drawing water from the reservoir to the desired point by capillary attraction, although the broad idea of my invention is not limited to this.

Figure 1:
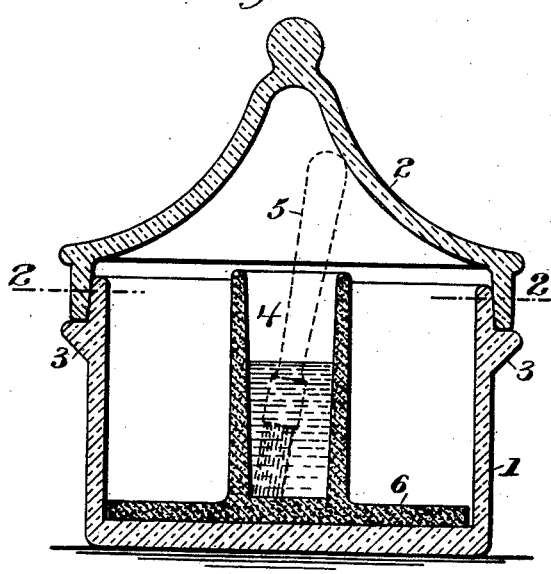
Figure 2:
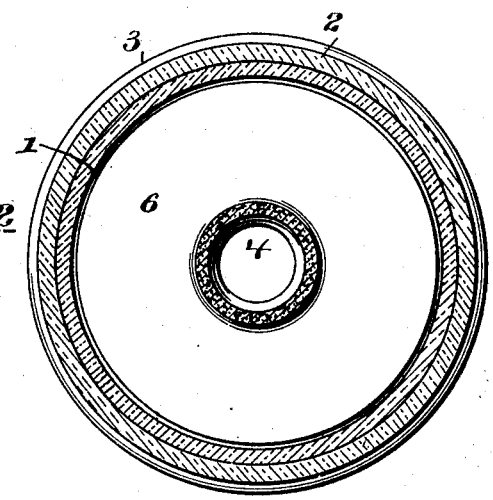

In the accompanying drawings, Figure 1 is a sectional elevation of a paste-jar provided with my improvements. Fig. 2 is a sectional plan taken on line 2 2 of Fig. 1.

Referring to Figs. 1 and 2, the jar 1, of glass or other material, may be of any convenient shape and size and is provided with a cover 2, making a tight joint to prevent evaporation of moisture from the jar. The preferred form of jar is of glass, and by making the meeting faces of the jar and its cover of ground glass an air-tight connection is secured in a very simple manner. The jar may be provided with a projecting ledge 3, upon which may rest the lower edge of the cover 2, passed over the top of the jar.

The water-reservoir may form part of the jar or cover or may be a separate vessel placed therein. According to my invention I employ means for delivering the water to a place above the surface of the paste, and preferably I utilize a pervious material for this purpose. To simplify the construction, I may form the reservoir 4 itself of pervious material and so place it that a portion of the material is above the highest level of the paste. From experiment I have found unglazed earthenware to be both economical and useful to carry out my invention.

Preferably the reservoir 4, in the form of a porous cup, is placed in the center of the jar 1 and made of a convenient shape to permit of a paste-brush being kept therein even when the cover 2 is on the jar. This reservoir 4 may be held in place in any suitable manner—as, for instance, the reservoir may have formed therewith a flange or disk 6, fitting approximately in the bottom of the jar.

The automatic operation is as follows: When water is placed in the reservoir 4, it percolates through the earthenware or other pervious material and also rises by capillary attraction to the top of the cup 4. Wherever the paste is in contact with the earthenware, it will be kept moist for a short distance therefrom; but while this is advantageous to some degree the moisture does not penetrate sufficiently far to keep the paste in proper condition at the part to be used—namely, at the upper surface. By raising the porous cup or a portion thereof above the paste as soon as the water rises in the material of the cup to a point above the surface of the paste it oozes out in drops, spreads out over this surface from the cup 4, and sinking in keeps the top layers just moist enough for proper use at all times.

I claim as my invention—

1. A paste holder or jar provided with a paste-compartment and a water-reservoir having a wall adapted to convey water to the upper surface of the paste.

2. A paste holder or jar provided with a water-reservoir, of pervious material, and having a portion thereof above the level of the paste.

In testimony whereof I have signed my name to this specification in the presence of two subscribing witnesses.

ELTWEED POMEROY.

Witnesses:
C. C. CHIPMAN,
EDITH J. GRISWOLD.